US011358506B2

(12) United States Patent
Koarai et al.

(10) Patent No.: US 11,358,506 B2
(45) Date of Patent: Jun. 14, 2022

(54) DEVICE FOR HOLDING BEVERAGE CONTAINER AND CONSOLE BOX

(71) Applicant: MORIROKU TECHNOLOGY COMPANY, LTD., Tokyo (JP)

(72) Inventors: Manabu Koarai, Tokyo (JP); Yuki Kujira, Tokyo (JP)

(73) Assignee: MORIROKU TECHNOLOGY COMPANY, LTD., Tokyo (JP)

( * ) Notice: Subject to any disclaimer, the term of this patent is extended or adjusted under 35 U.S.C. 154(b) by 254 days.

(21) Appl. No.: 16/774,578

(22) Filed: Jan. 28, 2020

(65) Prior Publication Data

US 2020/0269741 A1 Aug. 27, 2020

(30) Foreign Application Priority Data

Feb. 27, 2019 (JP) .............................. JP2019-034712

(51) Int. Cl.
*B60N 3/10* (2006.01)
*B60R 7/06* (2006.01)

(52) U.S. Cl.
CPC ................ *B60N 3/106* (2013.01); *B60R 7/06* (2013.01)

(58) Field of Classification Search
CPC ........ B60N 3/106; B60N 3/108; B60N 3/105; B60N 3/10; B60R 7/06; Y10S 224/926; A47G 23/0208; A47G 23/0216; A47G 23/0225; A47G 23/0266
USPC ...................................................... 248/311.2
See application file for complete search history.

(56) References Cited

U.S. PATENT DOCUMENTS

| 5,921,519 | A | * | 7/1999 | Dexter | ................... | B60N 3/106 248/311.2 |
| 6,691,967 | B2 | * | 2/2004 | Kaupp | ................... | B60N 3/106 224/926 |
| 7,487,945 | B2 | * | 2/2009 | Liu | ................... | B60N 3/106 248/311.2 |
| 10,293,732 | B2 | * | 5/2019 | Inoue | ................... | B60R 7/06 |
| 2003/0075661 | A1 | * | 4/2003 | Kaupp | ................... | B60N 3/106 248/311.2 |
| 2011/0297715 | A1 | * | 12/2011 | Kamiya | ................... | B60N 3/106 224/539 |
| 2018/0105089 | A1 | * | 4/2018 | Inoue | ................... | B60N 3/106 |

FOREIGN PATENT DOCUMENTS

| JP | 2000-127832 | 5/2000 |
| JP | 2018-065510 | 4/2018 |

* cited by examiner

*Primary Examiner* — Ingrid M Weinhold
(74) *Attorney, Agent, or Firm* — Rankin, Hill & Clark LLP

(57) ABSTRACT

A beverage container holding device includes a first rotating member supported by a holder main body such that the first rotating member can swing horizontally. The first rotating member includes a first shaft member supported by the holder main body and extending in an up-and-down direction, and a first main body supported by the first shaft member such that the first main body can be present in a receiving portion and retract from the receiving portion. The first main body includes a front contact surface portion having a contact portion, which the beverage container received in the receiving portion can contact. The front contact surface portion makes, at least at the contact portion, an obtuse angle with an imaginary line extending from a center of the first shaft member to the contact portion.

9 Claims, 9 Drawing Sheets

FIG.8B
EMBODIMENT

FIG.8A
COMPARATIVE EXAMPLE

FIG.9

DEVICE FOR HOLDING BEVERAGE CONTAINER AND CONSOLE BOX

FIELD OF THE INVENTION

The present invention relates to a device for holding a beverage container and a console box equipped with the beverage container holding device.

BACKGROUND OF THE INVENTION

For example, a vehicle such as an automobile may have a device for holding one or more beverage containers. A certain type of the beverage container holding device is provided in a console box arranged at a front center position in a passenger compartment (cabin, interior) of an automobile. Patent Literature Document 1 (Japanese Patent Application Laid-Open Publication No. 2018-65510) discloses a conventional device for holding a beverage container.

The beverage container holding device disclosed in Japanese Patent Application Laid-Open Publication No. 2018-65510 is provided in an instrument panel arranged in a front area of a passenger compartment of an automobile, and pulled out toward a passenger or a driver when the device is used. The passenger can pull the beverage container holding device out from the instrument panel, and place a beverage container into the beverage container holding device from the top of the beverage container holding device.

The beverage container holding device disclosed in Japanese Patent Application Laid-Open Publication No. 2000-127832 includes a holder main body, which has a generally U-shaped receiving portion to receive a beverage container, and a rotating member, which is supported by the receiving portion such that the rotating member can swing horizontally relative to the holder main body and can be present in the receiving portion and retract from the receiving portion. The top and rear of the receiving portion are open, and a front portion of the receiving portion is defined by a bottom of the U shape when viewed from the top.

SUMMARY OF THE INVENTION

Figure 9:
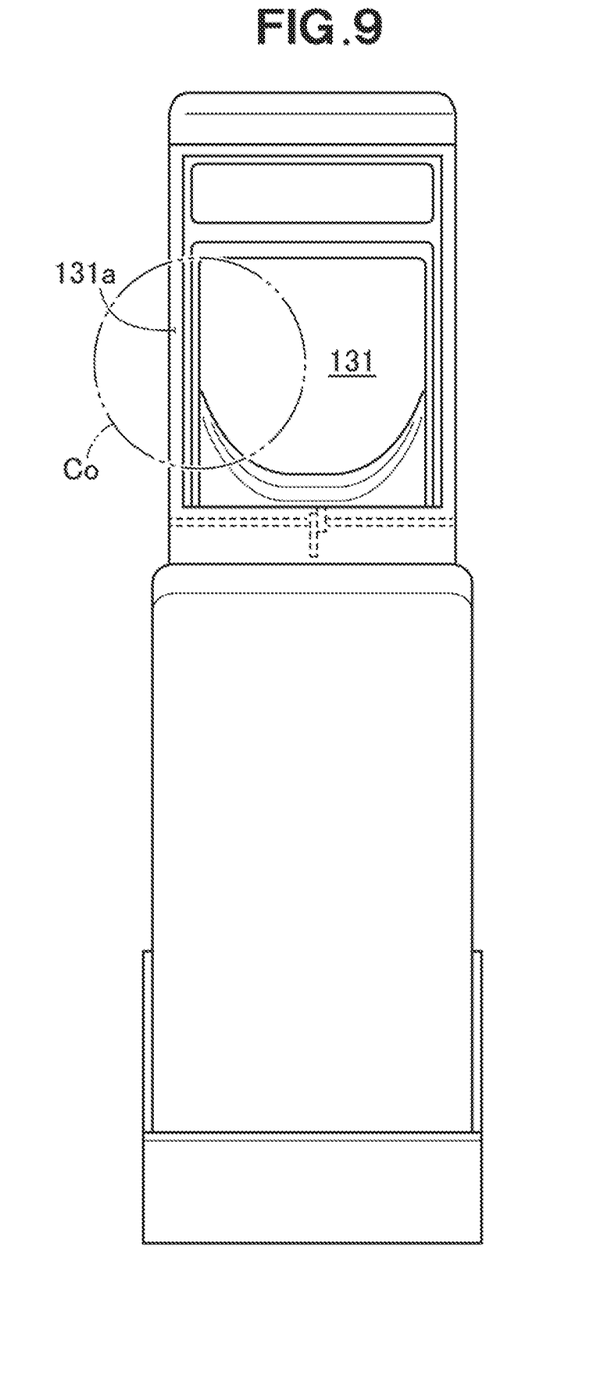
FIG. 9 is a view useful to describe a problem of a conventional beverage container holding device.

Reference is made to FIG. 9 of the accompanying drawings. FIG. 9 is useful to describe drawbacks of the beverage container holding device disclosed in Japanese Patent Application Laid-Open Publication No. 2018-65510. A passenger or a driver in an automobile places a beverage container Co in a holding portion 131, which is designed to receive the beverage container Co, from the top of the holding portion 131. When placing the beverage container Co in the holding portion 131, it is difficult for the passenger/driver to see the position of the holding portion 131 due to the beverage container Co. Thus, when the passenger/driver places the beverage container Co in the holding portion 131, the bottom of the beverage container Co may contact an edge 131a of the holding portion 131. If the holding portion 131 has a larger size, the gap between the holding portion 131 and the beverage container Co becomes large, and a problem arises, i.e., the beverage container Co moves in the holding portion 131.

To avoid such problem, the beverage container holding device disclosed in Japanese Patent Application Laid-Open Publication No. 2000-127832 is configured to allow the beverage container to slide into the beverage container holding device from the rear portion of the beverage container holding device toward the front portion of the beverage container holding device. Rotating members are disposed at a rear end, and the widths of the rotating members reduce a possibility that the beverage container would contact the edge of the holding portion.

When an automobile travels, forces act on the beverage container in directions that intend to move the beverage container in a front direction, a rear direction, a right direction and/or a left direction. The beverage container holding device of Japanese Patent Application Laid-Open Publication No. 2000-127832 may suffer from a possibility that the beverage container would fly out of the holding portion when the beverage container moves toward the rotating member.

An object of the present invention is to provide a beverage container holding device that can hold the beverage container in a reliable manner while allowing the beverage container to be received in the beverage container holding device in an easy manner.

According to one aspect of the present invention, there is provided a beverage container holding device that includes a holder main body, which has a generally U-shaped receiving portion to receive a beverage container, with a top thereof and a bottom thereof being open, a front of the receiving portion being a bottom of a generally U shape when viewed from above, and at least one first rotating member, each of which is supported by the holder main body such that each first rotating member can swing horizontally and can be present in the receiving portion and retract from the receiving portion, each first rotating member including a first shaft member extending in an up-and-down direction, and a first main body rotatably supported by the first shaft member such that the first main body can be present in the receiving portion and retract from the receiving portion, the first main body including a rear contact surface portion, which the beverage container can contact when the beverage container is received in the receiving portion from a rear of the receiving portion, and a front contact surface portion having at least one contact portion, which the beverage container received in the receiving portion can contact, the first main body being configured to be able to swing in a first direction when a forward force is exerted on the rear contact surface portion, and a rotation of the first main body in a reverse direction, which is opposite to the first direction, being restricted by a stopper when the beverage container is not received in the receiving portion, and the front contact surface portion configured to make, at least at each contact portion, an obtuse angle with an imaginary line extending from a center of each first rotating member to the contact portion concerned.

In the present invention, the beverage container holding device has the first rotating member that can be present in the receiving portion and retract from the receiving portion, and the receiving portion is open at the rear thereof. The beverage container may be put into the receiving portion by forwardly sliding the beverage container from the rear of the holder main body. Because the width of the first rotating member can restrict or prevent the contact between the beverage container and an edge of the receiving portion, it is possible to easily put the beverage container into the receiving portion. At least at the contact portion, the front contact surface portion makes an obtuse angle with the imaginary line extending from the center of the first shaft member to the contact portion. When a backward force acts on the beverage container, the backward force is transmitted to the contact portion. The inclination angle of the front contact surface portion at the contact portion is obtuse relative to the imaginary line. Thus, a force that causes the first main body to rotate in the reverse direction is exerted on the first main body. The rotation in the reverse direction is restricted by the stopper. Accordingly, it is possible to provide the beverage container holding device that can reliably hold the beverage container while allowing easy receiving of the beverage container.

DETAILED DESCRIPTION OF THE PREFERRED EMBODIMENTS

Embodiments of the present invention will now be described below with reference to the accompanying drawings. In the following description, "right" and "left" are directions viewed from a passenger (or a driver) in an automobile, and "front" and "rear" are directions viewed from a beverage container holding device. In the drawings, "Fr" indicates the front when viewed from the beverage container holding device, "Rr" indicates the rear when viewed from the beverage container holding device, "Le" indicates the left from the passenger (or the driver), "Ri" indicates the right from the passenger (or the driver), "Up" indicates the upward direction, and "Dn" indicates the downward direction. In the embodiments, the front and rear directions of the beverage container holding device coincide with the forward and backward moving directions of the automobile.

Embodiments

Figure 1:
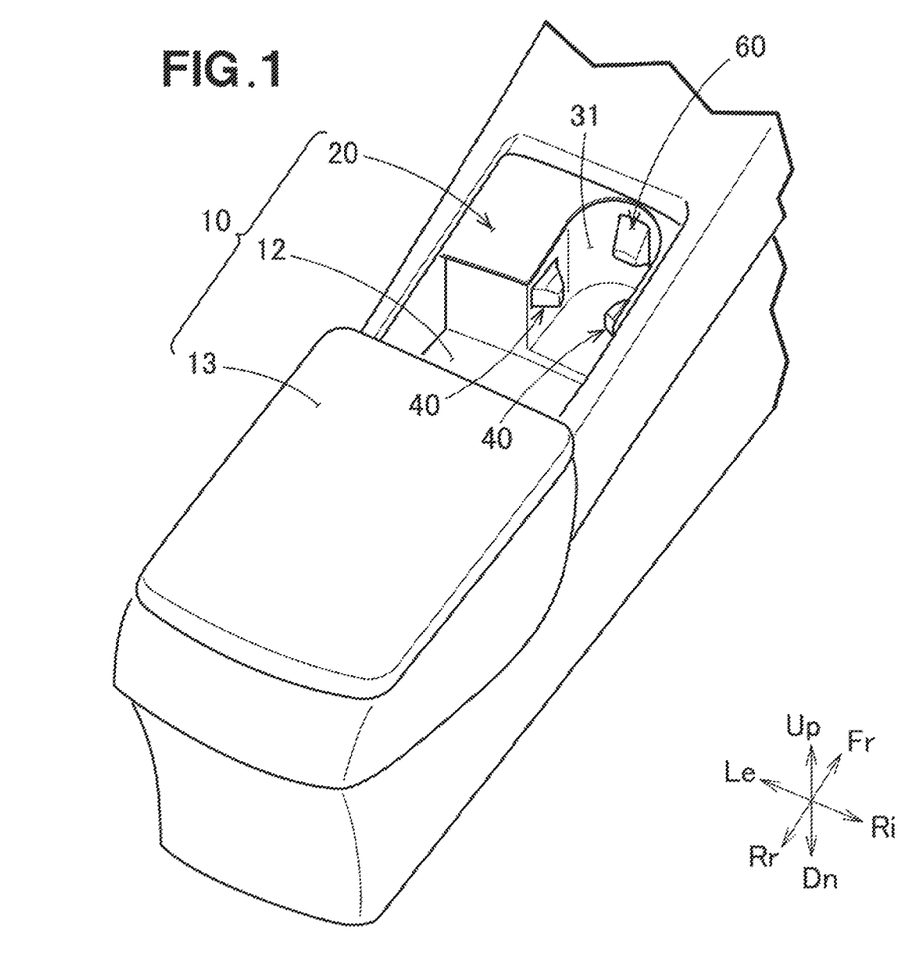
FIG. 1 is a perspective view of a beverage container holding device and a console box according to an embodiment of the present invention.

Reference is made to FIG. 1. FIG. 1 shows a console box 10, which extends from the front center of a passenger compartment (cabin, interior) in the backward direction of the automobile, and a beverage container holding device 20, which is provided in a front portion of the console box 10. The console box 10 is disposed between a right seat (driver's seat) and a left seat (passenger's seat), and a passenger/driver can put his/her things and belongings in the console box 10.

The console box 10 has the beverage container holding device 20 to hold a beverage container, a tray 12 that continuously extends from a rear end of the beverage container holding device 20 and defines a surface on which the passenger's (or the driver's) things such as small articles can be put, and an armrest 13 provided behind the tray 12 to allow the passenger (or the driver) to put his/her arm thereon.

The top of the beverage container holding device 20 and the top of the tray 12 are exposed to the passenger compartment. In other words, the top of the beverage container holding device 20 is open, and the top of the tray 12 is open.

Figure 2:
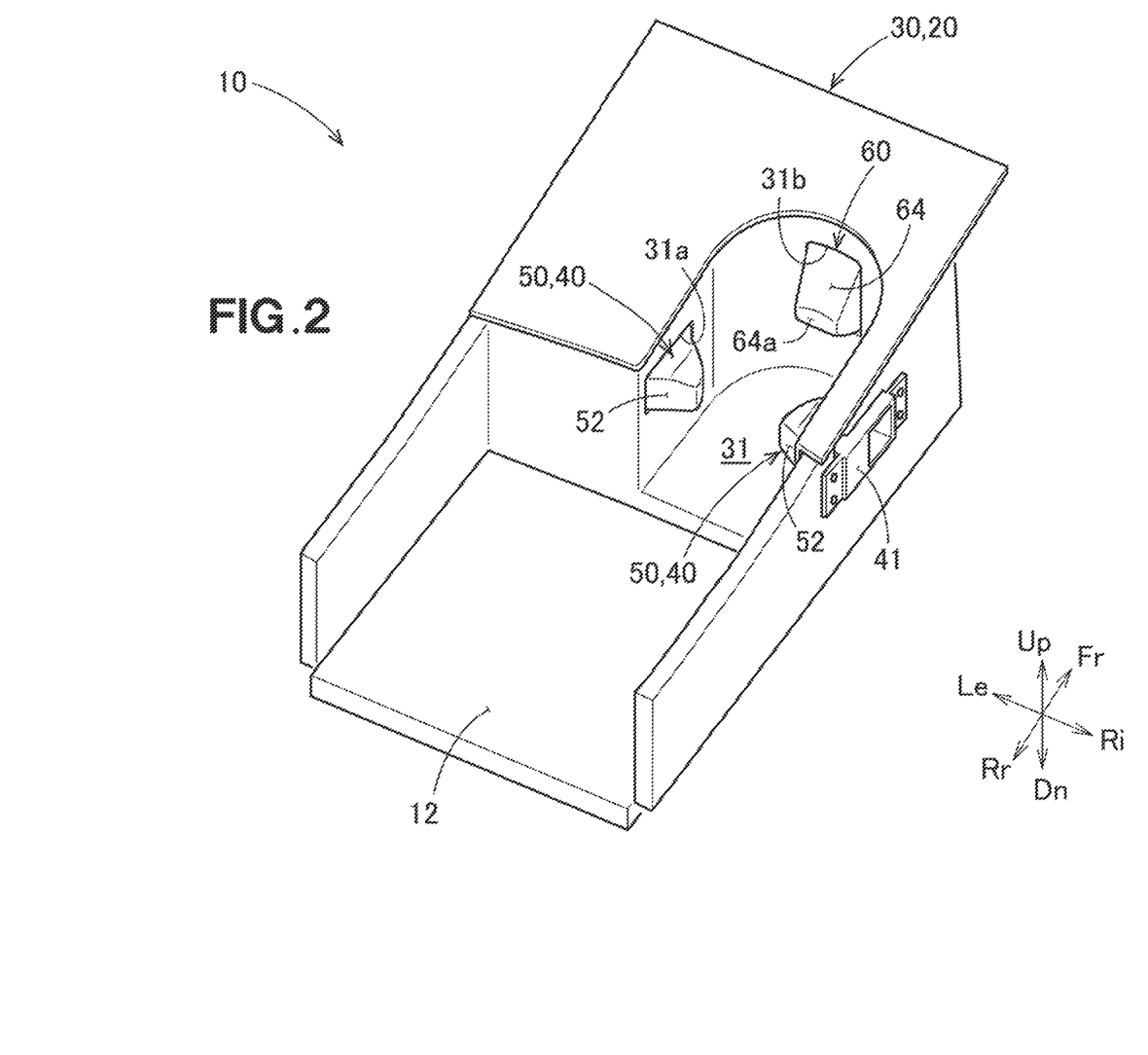
FIG. 2 is a perspective view of a tray and the beverage container holding device shown in FIG. 1.
Figure 3:
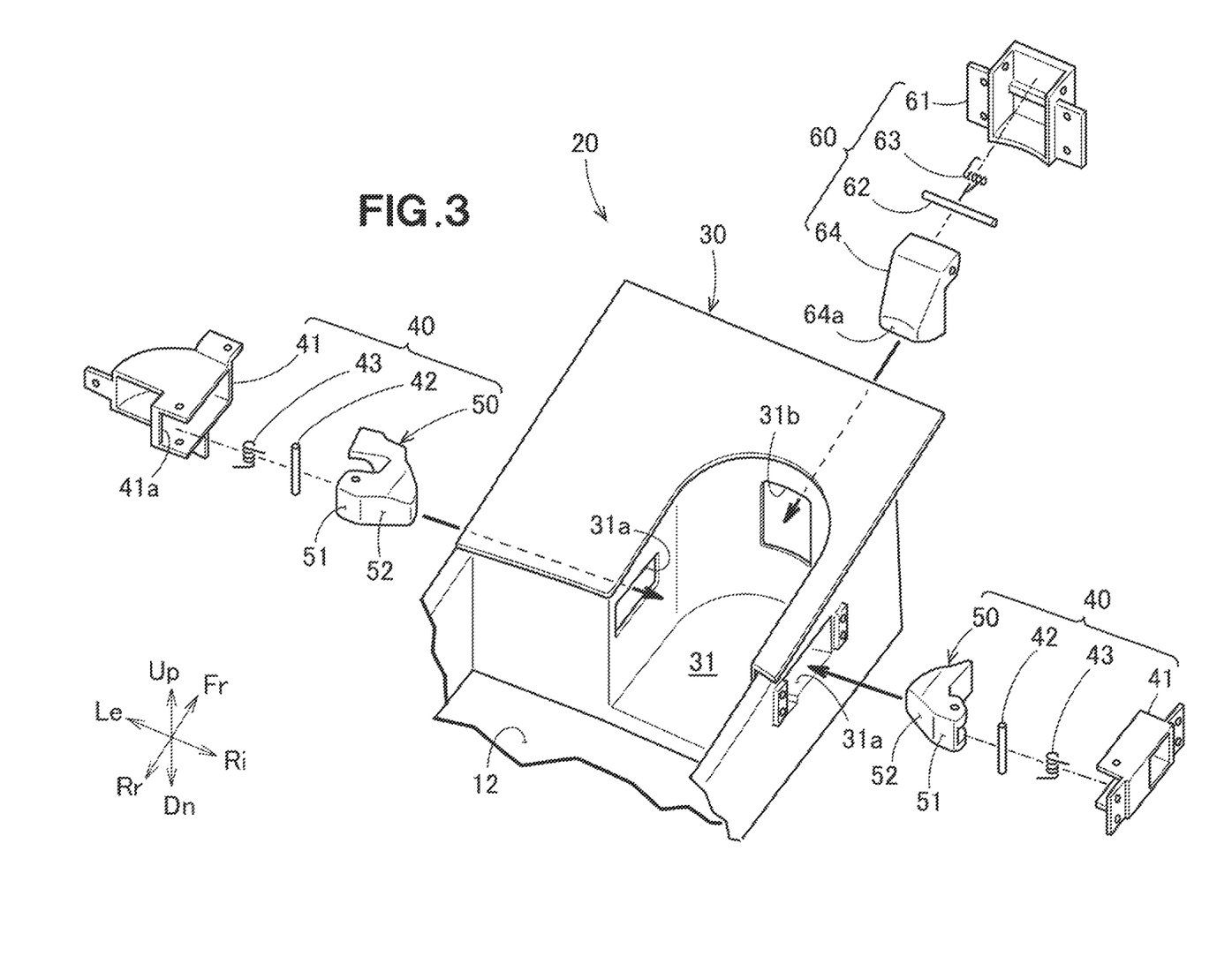
FIG. 3 is an exploded perspective view of the beverage container holding device shown in FIG. 2.

Referring to FIG. 2 and FIG. 3, the beverage container holding device 20 includes a holder main body 30 fixed to the console box 10 (see FIG. 1), a pair of first rotating members and 40 that are rotatably supported by the holder main body 30, and a second rotating member 60 that is provided in front of the first rotating members 40 and 40 and rotatably supported by the holder main body 30.

A receiving portion 31 is formed in the holder main body 30. A top and a rear of the receiving portion 31 are open. The receiving portion 31 can receive the beverage container. The receiving portion 31 is offset to the right (toward a driver's seat) from the center in the right-and-left direction of the holder main body 30. The receiving portion 31 has a generally U shape when viewed from the top, with the bottom of the U shape defining the front end of the receiving portion. It should be noted that the U shape may have no rounding portions, i.e., the U shape may have three straight lines with two right-angle corners. In other words, the "generally U shape" encompasses a shape that only has two parallel straight lines and a connecting straight line. Right and left side walls of the receiving portion 31 have side wall holes 31a and 31a, respectively, such that the first rotating members 40 and 40 are disposed in the side wall holes 31a and 31a, respectively. A front wall hole 31b is formed at the center of the front end of the receiving portion 31 such that the second rotating member 60 is disposed in the front wall hole 31b.

Each of the side wall holes 31a and 31a is a generally rectangular hole, which is elongated in the front-and-rear direction. The front wall hole 31b is a generally rectangular hole, which is elongated in the up-and-down direction. The front wall hole 31b is positioned forward when viewed from the side wall holes 31a and 31a.

Referring to FIG. 3, the right and left first rotating members 40 and 40 face each other over the receiving portion 31. The right and left first rotating members 40 and 40 are spaced from each other.

The left first rotating member 40 includes a first supporting member 41 fixed to the holder main body 30, a first shaft member 42 supported by the first supporting member 41 and extending in the up-and-down direction, a first biasing member 43 fitted over the first supporting member 41, and a first main body 50 biased toward the receiving portion 31 by the first biasing member 43 and rotatably supported by the first shaft member 42. It should be noted that the first shaft member 42 may be united to the first supporting member 41 to make these two members as a one-piece element, or the first shaft member 42 may be united to the first main body 50 to make these two elements as a one-piece element.

Figure 4:
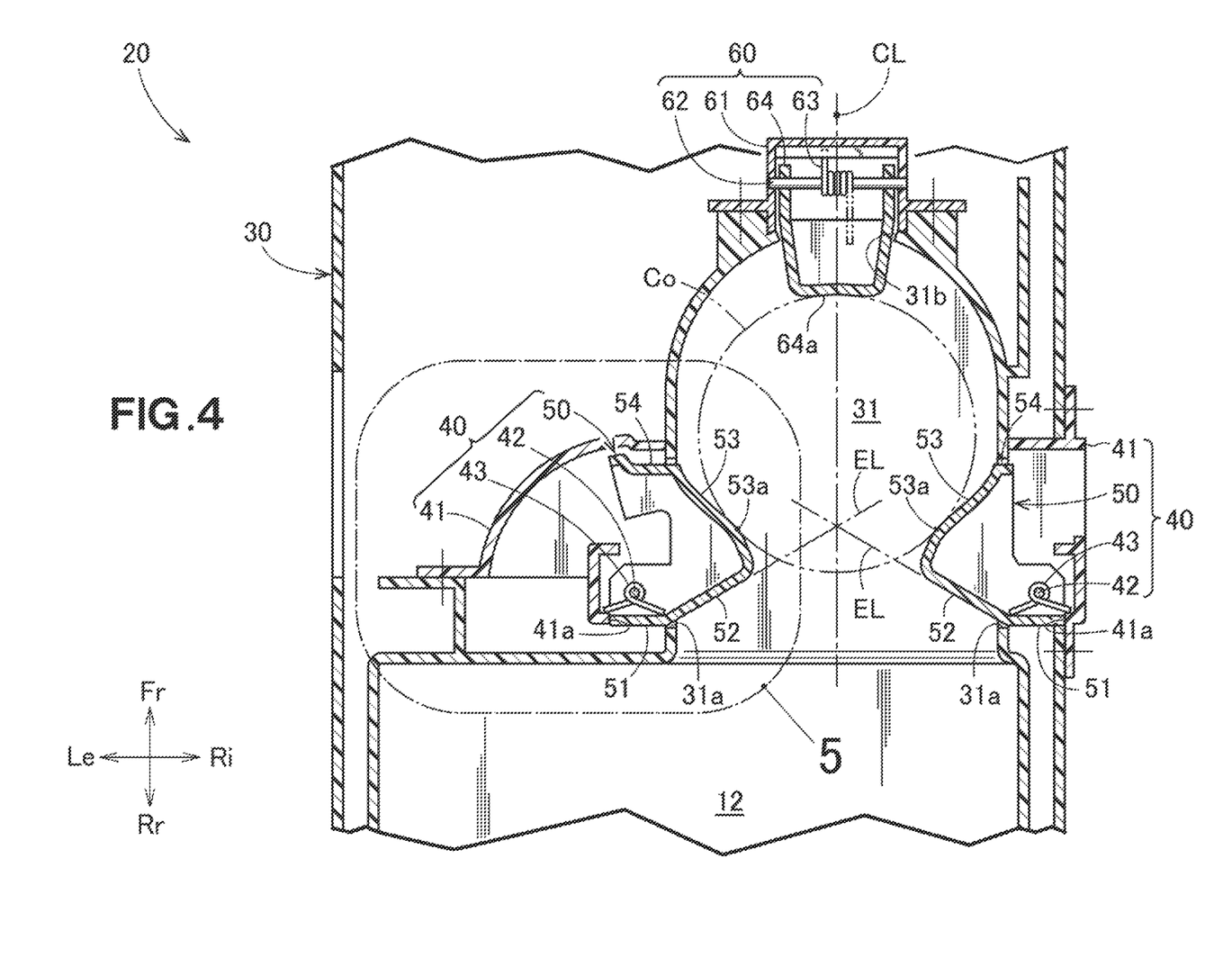
FIG. 4 is a cross-sectional view of the beverage container holding device shown in FIG. 2 when viewed from the top.

Referring to FIG. 4, the left first supporting member 41 has a stopper 41a onto which an end of the first main body 50 abuts, such that the stopper 41a prevents the clockwise rotation of the first main body 50. In other words, the stopper 41*a* is united to the first supporting member 41 to make these two elements a one-piece element.

Figure 5:
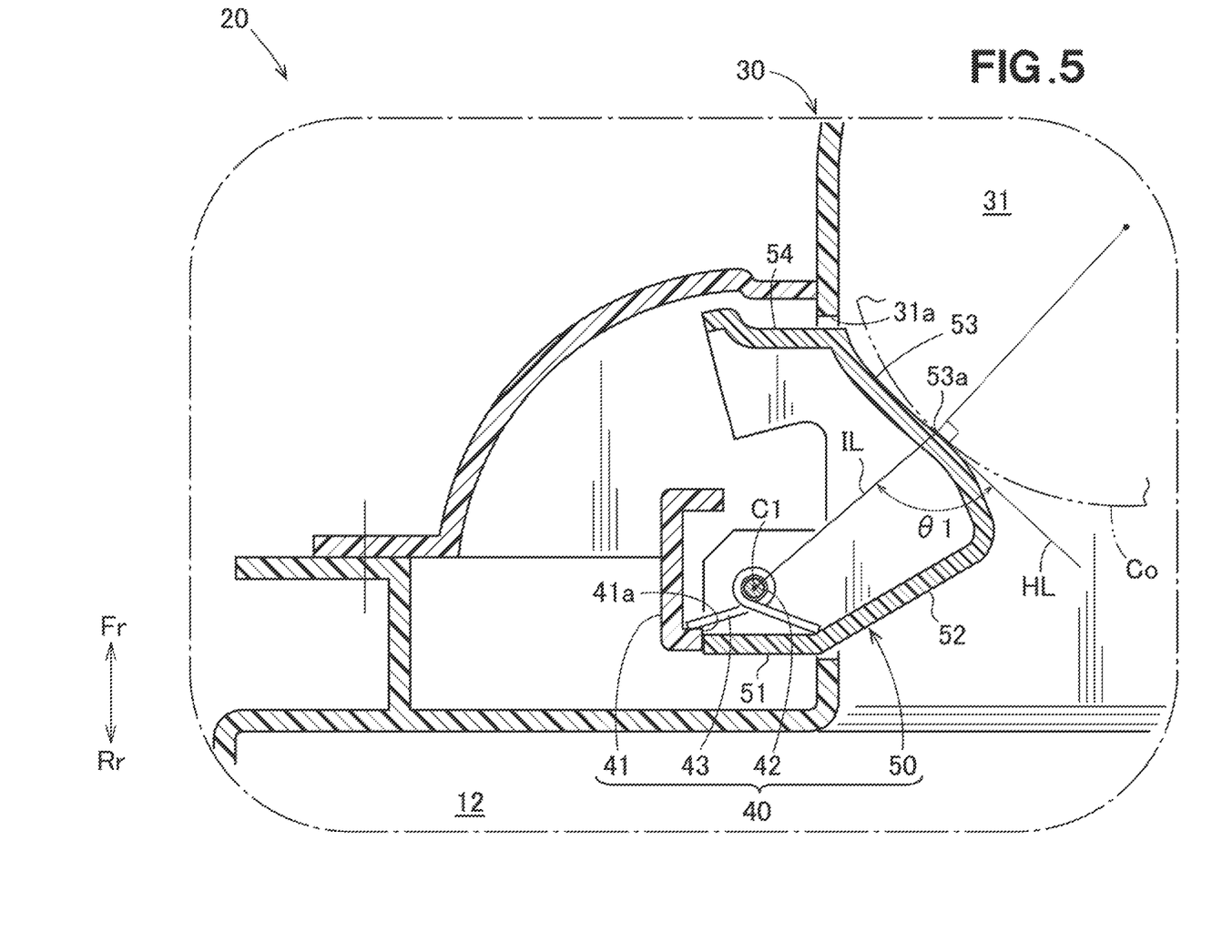
FIG. 5 is an enlarged view of a part 5 in FIG. 4.

Referring to FIG. 5, the first main body 50 is disposed in the side wall hole 31*a* and can be present in the receiving portion 31 (can protrude from the side wall hole) and retract from the receiving portion 31. The first main body 50 has a first rear wall 51, which extends toward the center in the right-and-left direction, with one end of the first rear wall 51 abutting the stopper 41*a*, a rear contact surface portion 52, which diagonally extends toward the receiving portion 31 from the front end of the first rear wall 51 such that the beverage container Co can contact the rear contact surface portion 52 as the beverage container Co is received in the receiving portion 31, a front contact surface portion 53, which diagonally extends toward the first supporting member 41 from the front end of the rear contact surface portion 52 such that the beverage container Co can contact the front contact surface portion 53 as the beverage container Co is received in the receiving portion 31, and a first front wall 54, which extends to the outside from the front end of the front contact surface portion 53.

The rear contact surface portion 52 is planar. It should be noted, however, that the rear contact surface portion 52 may have a bending shape such as a concave shape or a convex shape.

The front contact surface portion 53 has a bending shape. The front contact surface portion 53 includes a contact portion 53*a*, which the beverage container Co contacts as the beverage container Co is received in the receiving portion 31. The contact portion 53*a* of the front contact surface portion 53 makes an obtuse angle with an imaginary line IL extending to the contact portion 53*a* from the center C1 of the first shaft member 42.

Figure 6:
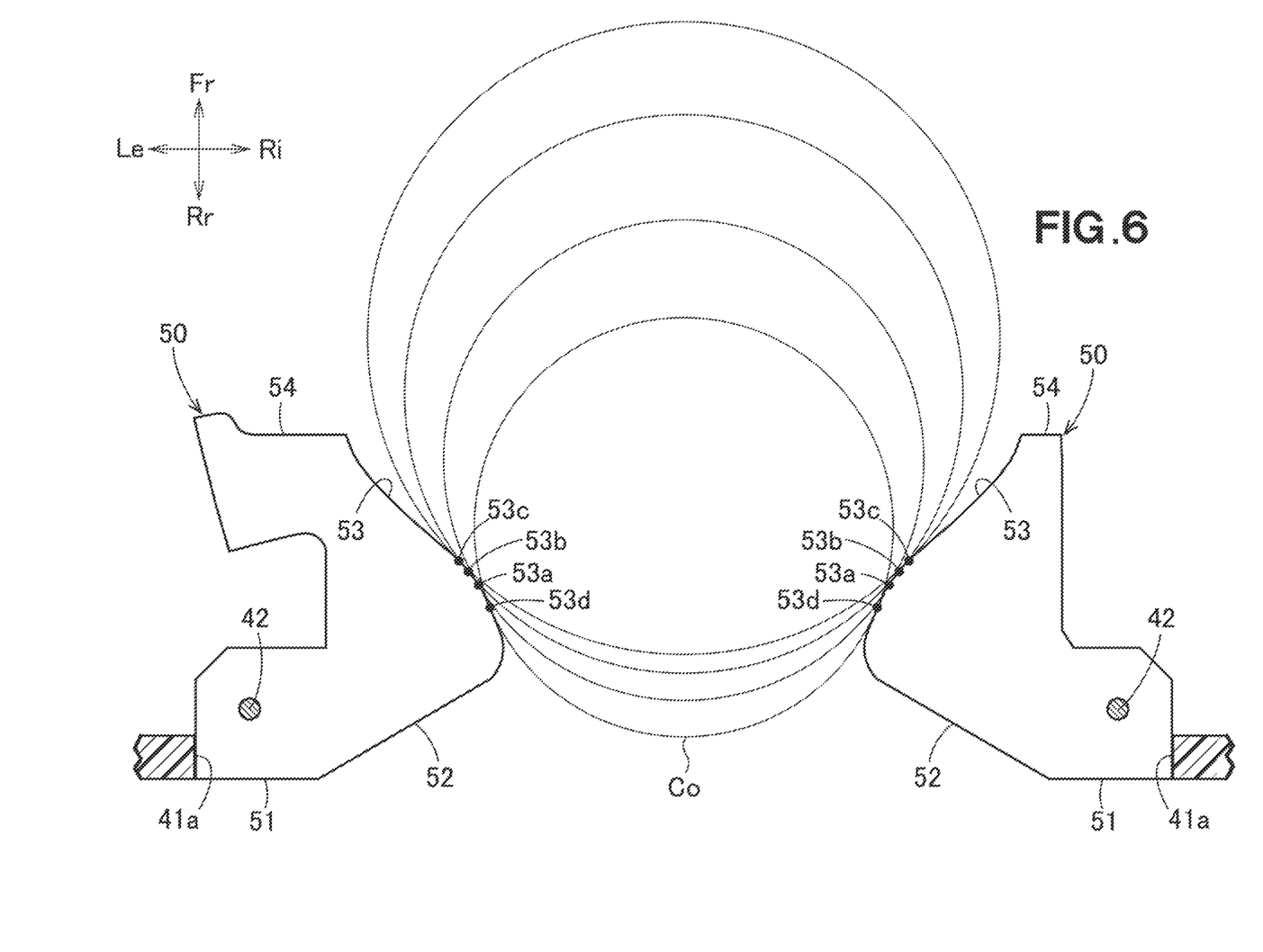
FIG. 6 is a view useful to describe a shape of a front contact face portion shown in FIG. 4.

Referring also to FIG. 6, the front contact surface portion 53 includes a plurality of (e.g., four) contact portions 53*a*, 53*b*, 53*c* and 53*d* depending upon the radius of the beverage container Co. Each of the contact portions 53*a*, 53*b*, 53*c* and 53*d* of the front contact surface portion 53 makes an obtuse angle with the imaginary line IL extending to the contact portion 53*a* from the center C1 of the first shaft member 42. Specifically, the angle θ1 between a line segment from the center of the first shaft member 42 to the contact portion 53*a* (imaginary line IL) and a half straight line HL extending backward from the contact portion 53*a* along a tangential line of the contact portion 53*a* is an obtuse angle (i.e., θ1>90 degrees).

Figure 7A:
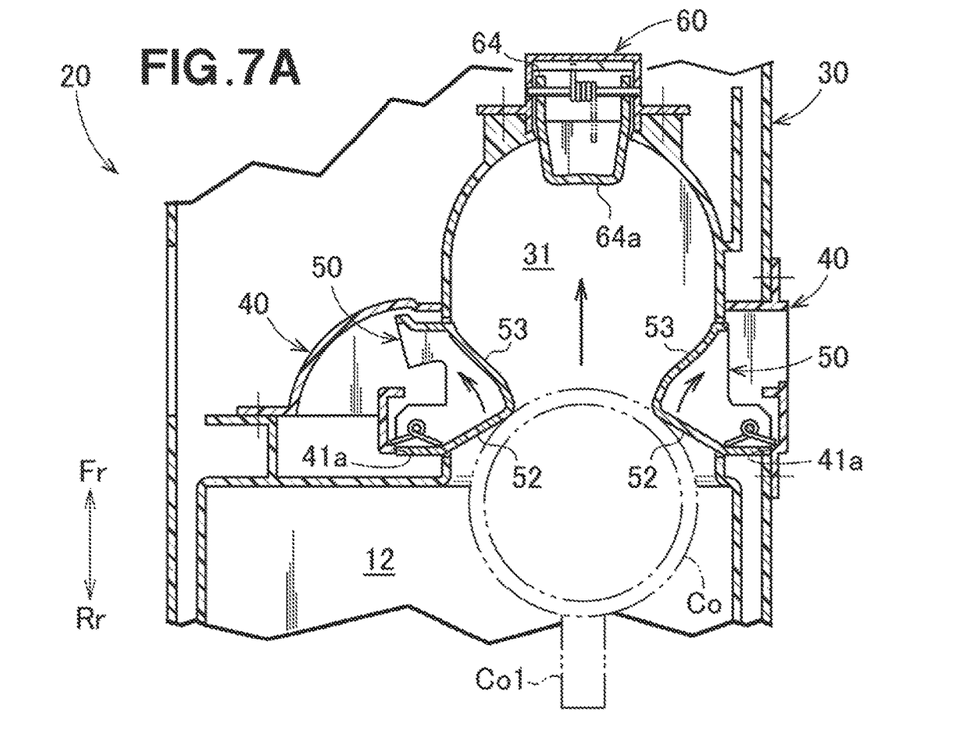
FIG. 7A is a view useful to describe how a beverage container is received.

Referring to FIG. 7A, the fundamental configuration of the right first rotating member 40 is similar to the left first rotating member 40. Thus, the same reference numerals are used, and the detail description of the right first rotating member 40 is omitted. The left first rotating member 40 and the right first rotating member 40 are different from each other with respect to the shape of the first main body 50 and the rotatable direction of the first main body 50. The right first main body 50 is only able to rotate clockwise in FIG. 7A.

The rotating direction of each of the first main bodies 50 and 50 upon receiving the beverage container Co in the receiving portion 31 is referred to as the first direction in this specification. The first direction of the left first main body 50 is counterclockwise, and the first direction of the right first main body 50 is clockwise. The rotating direction opposite to the first direction is referred to as a reverse direction. When the beverage container Co is not received in the receiving portion 31, the rotation of each of the first main bodies 50 and 50 in the reverse direction is restricted by the associated stopper 41*a*.

It should be noted that the right and left first rotating members 40 and 40 may have different shapes under given conditions if the purposes and the functions of the first rotating members 40 and 40 do not change. The right and left first rotating members 40 and 40 may have symmetric shapes bilaterally (right-left symmetry).

Referring to FIG. 4, the extension line EL from the right rear contact surface portion 52 and the extension line EL from the left rear contact surface portion 52 cross each other on the center line CL at the same angle. The center line CL extends in the front-and-rear direction along the center of the receiving portion 31 when viewed from the top.

The second rotating member 60 includes a second supporting member 61 fixed to the holder main body 30, a second shaft portion 62 supported by the second supporting member 61 and extending in the right-and-left direction, a second biasing member 63 fitted over the second shaft portion 62, and a second main body 64 rotatably supported by the second shaft portion 62 and biased toward the receiving portion 31 by the second biasing member 63. It should be noted that the second shaft member 62 may be united to the second supporting member 61 to make these two members as a one-piece element, or the second shaft member 62 may be united to the second main body 64 to make these two elements as a one-piece element.

The second main body 64 is disposed in the front wall hole 31*b* formed at the center area of the bottom of the U shape of the receiving portion 31 such that the second main body 64 can be present in the receiving portion 31 and retract from the receiving portion 31. The second main body 64 can swing (pivot) in the front-and-rear direction depending upon the radius of the beverage container Co. The second main body 64 has a second contact surface portion 64*a*, which can contact the beverage container Co as the beverage container Co is received in the receiving portion 31. The second contact surface portion 64*a* has a bending shape. It should be noted that the second contact surface portion 64*a* may have a flat shape.

Reference is made to FIG. 7A. For example, a passenger or a driver slides (moves, carries) the beverage container Co toward the receiving portion 31 from above the tray 12 if he/she intends to cause the beverage container Co to be held by the beverage container holding device 20. The passenger or the driver keeps pushing the beverage container Co forward against the biasing forces of the first main bodies 50 and 50, even after the beverage container Co contacts the rear contact surface portions 52 and 52. The beverage container Co is finally held as the beverage container Co is received in the receiving portion 31.

Figure 7B:
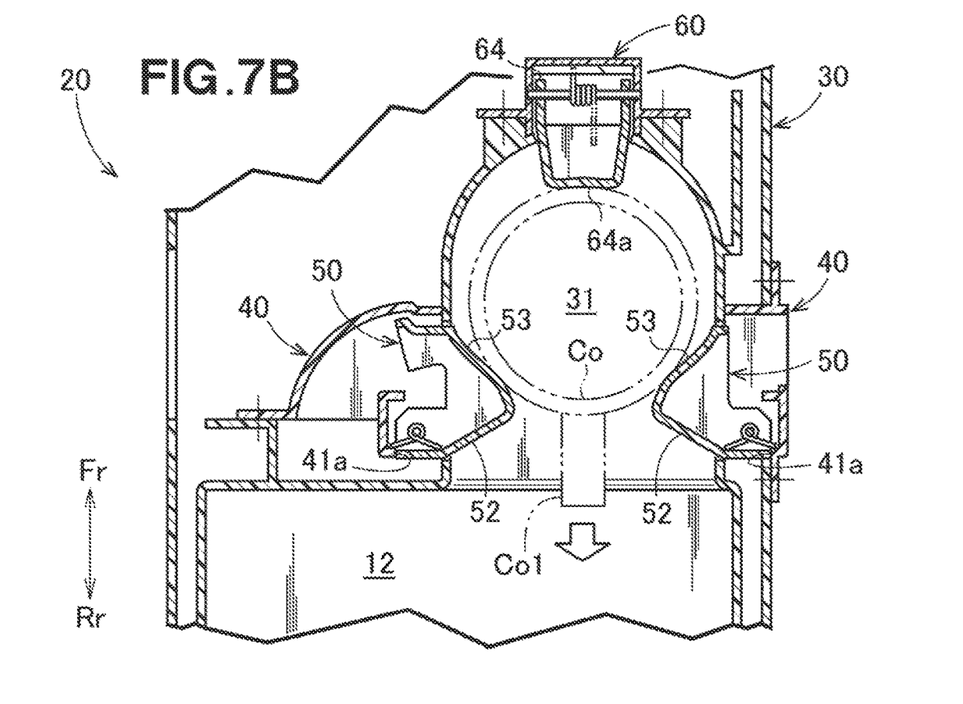
FIG. 7B is a view useful to describe when a backward force acts on the beverage container in the receiving portion.

Referring to FIG. 7B, when the beverage container Co is situated in the receiving portion 31, the beverage container Co is held (supported) at three points, i.e., the front contact surface portions 53 and 53 and the second contact surface portion 64*a*. Referring also to FIG. 6, the position of the second main body 64 changes with the radius of the beverage container Co because the second main body 64 swings depending upon the position of the beverage container Co. On the other hand, the positions of the first main bodies 50 and 50 do not change after the beverage container Co is received in the receiving portion 31.

When the passenger or the driver wants to take the beverage container Co out of the receiving portion 31, he/she lifts the beverage container Co upwards. With such action, it is possible to take the beverage container Co out of the receiving portion 31.

Now, the advantages of the above-described beverage container holding device 20 will be described.

Referring to FIG. 7A, the beverage container holding device 20 has the first rotating members 40 and 40 that can be present in the receiving portion 31 and retract from the receiving portion 31, and the rear portion of the receiving portion 31 is open. It is possible to place the beverage container Co into the receiving portion 31 by causing the beverage container Co to slide from the rear portion of the holder main body in the forward direction. Because the widths of the first rotating members 40 and 40 prevent the beverage container Co from contacting the edge of the receiving portion 31, it is possible to easily place the beverage container Co in the receiving portion 31.

Figure 8A:
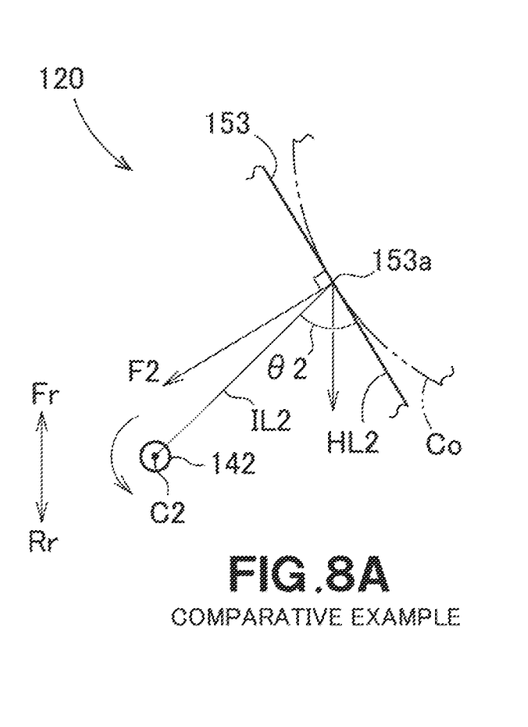
FIG. 8A is a view useful to describe a principle of behavior of a beverage container holding device according to a comparative example.

Referring to FIG. 8A, illustrated is a beverage container holding device 120 according to a comparative example. In the beverage container holding device 120, a contact portion 153a of a front contact surface portion 153 makes an acute angle with an imaginary line IL2 extending from the center C2 of a first shaft member 142 toward the contact portion 153a. Specifically, the angle θ2 between a line segment from the center C2 of the first shaft portion 142 to the contact portion 153a (imaginary line IL2) and a half straight line HL2 extending backward from the contact portion 153a along a tangential line of the contact portion 153a is an acute angle (i.e., θ2<90 degrees).

In this situation, if a force acts on the beverage container Co in the backward direction, this backward force is transmitted to the contact portion 153a. The inclination angle of the front contact surface portion 153 at the contact portion 153a is an acute angle relative to the imaginary line IL2. Thus, a force F2, which is directed in a direction shifted outwardly from the center C2 of the first shaft member 142, is generated at the contact portion 153a. As a result, a force, which causes the first main body 150 to rotate in the first direction, is exerted on the first main body 150. In other words, a force, which causes the first main body 150 to rotate in a swingable direction, is applied to the first main body 150. Accordingly, the first main body 150 rotates while allowing the front contact surface portion 153 to slide relative to the surface of the beverage container Co. Because the front contact surface portion 153 is displaced, there is a possibility that the beverage container Co would fly out of the receiving portion 31 (see FIG. 4).

Figure 8B:
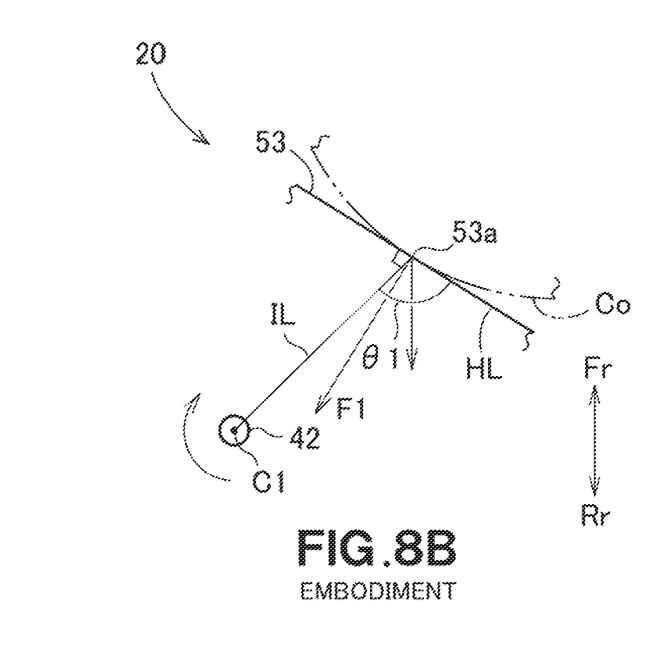
FIG. 8B a view useful to describe a principle of behavior of the beverage container holding device according to the embodiment of the present invention.

Referring to FIG. 8B, illustrated is the beverage container holding device 20 according to the embodiment of the present invention. The contact portion 53a of the front contact surface portion 53 makes an obtuse angle with the imaginary line IL extending to the contact portion 53a from the center C1 of the first shaft member 42. When a backward force acts on the beverage container Co, the backward force is transmitted to the contact portion 53a. The inclination angle θ1 of the front contact surface portion 53 at the contact portion 53a is an obtuse angle relative to the imaginary line IL. In this situation, a force F1, which is directed in a direction shifted inwardly from the center C2 of the first shaft member 42, is generated at the contact portion 53a. As a result, a force, which causes the first main body 50 to rotate in the reverse direction, is exerted on the first main body 50.

Referring to FIG. 7B, the rotation of each first main body 50 in the reverse direction is restricted by the stopper 41a. Thus, it is possible to provide the beverage container holding device 20 that can reliably hold the beverage container Co while allowing the passenger/driver to easily put the beverage container Co in the receiving portion.

The first rotating members 40 and 40, which are disposed in at least two facing positions, are spaced from each other when the first rotating members protrude into the receiving portion 31. Thus, the beverage container holding device 20 can hold a beverage container holding device Co having a handle Co1, such as a mug.

The second main body 64 has a second contact surface portion 64a that can contact the beverage container Co when the beverage container Co is received in the receiving portion 31. Thus, it is possible to hold the beverage container Co with the first rotating members 40 and 40 and the second rotating member 60. Because the beverage container Co is forced to contact a plurality of portions 40, 40 and 60, it is possible to hold the beverage container Co in a stable manner.

In particular, the first rotating members 40 and 40 and the second rotating member 60 are arranged like an isosceles triangle, with the second rotating member 60 being a top apex. The force transmitted from the second rotating member 60 to bias the beverage container Co is equally transmitted to the two first rotating members 40 and 40. This is desirable because the beverage container Co is held at the three points, and the forces exerted onto the rotating members 40, 40 and 60 are more equalized.

Referring also to FIG. 6, the front contact surface portions 53 and 53 have a plurality of contact portions 53a and 53a, which may change with the radius of the beverage container Co. Each of the front contact surface portions 53 and 53 (or the contact portions 53a and 53a) has a bending shape. The beverage container Co to be received in the receiving portion 31 may have a different radius. When the radius of the beverage container Co changes, the positions of the contact portions 53a and 53a also change. Because the front contact surface portions 53 and 53 have a plurality of contact portions 53a and 53a, which change their positions with the radius of the beverage container Co, and each of the front contact surface portions 53 and 53 has the bending shape, it is possible to more reliably reduce a possibility that the beverage container Co would fly out of the receiving portion 31.

Referring to FIG. 1, the bottom of the holder main body 30 (bottom of the receiving portion 31) is situated at a forward position in the automobile's moving direction. Thus, it is possible to easily put the beverage container into the receiving portion from a driver's seat or a passenger's seat.

The console box 10 continuously extends from a rear end of the beverage container holding device 20, and includes the tray 12 that has an open top to put things and articles on the tray. It is possible to secure a large space behind the beverage container holding device 20. It is possible to bring the beverage container Co into the beverage container holding device 20 from above the tray 12, and this ensures high usability. If a small thing such as a coin accidentally falls into the receiving portion 31, it is possible to pick up the small thing as a passenger or a driver extends his/her hand into the receiving portion 31 from the tray 12. It is also possible to easily move the small thing into the tray 12 from the receiving portion 31.

It should be noted that the beverage container holding device of the present invention is applicable to vehicles other than automobiles, and applicable to construction machines or the like. Although it has been assumed in the above-described embodiment that the rear of the beverage container holding device coincides with the rear in the moving direction of the automobile, the rear of the beverage container holding device does not necessarily coincide with the rear in the moving direction of the automobile. Specifically, the front-and-rear direction of the beverage container holding device may be directed in the right-and-left direction of the automobile to allow the beverage container to be brought into the beverage container holding device from the right-and-left direction of the automobile. In the present invention, it is important that the beverage container is placed into the beverage container holding device from the rear of the beverage container holding device, and taken upward from the beverage container holding device.

Although the beverage container holding device of the present invention is disposed in the console box in the above-described embodiment, the beverage container holding device may be disposed in the instrument panel, a door trim or the like.

The present invention is not limited to the embodiment as long as an alternative can demonstrate the same functions and advantages as the present invention.

What is claimed is:

1. A beverage container holding device comprising: a holder main body, which has a generally U-shaped receiving portion to receive a beverage container, with a top and a rear of the receiving portion being open, a front of the receiving portion is closed and opposite to the rear of the receiving portion; and at least one first rotating member, each of said at least one first rotating member being rotatably supported by the holder main body such that each of said at least one first rotating member swings horizontally so as to extend into the receiving portion and retract from the receiving portion,
    each of said at least one first rotating member comprising a first shaft member extending in an up-and-down direction, and a first main body rotatably supported by the first shaft member such that the first main body extends into the receiving portion and retracts from the receiving portion,
    the first main body comprising a rear contact surface portion, which the beverage container is configured to engage when the beverage container is moved into the receiving portion from the rear of the receiving portion, and a front contact surface portion having at least one contact portion, which is configured to contact the beverage container received in the receiving portion forward of the front contact surface portion,
    the first main body being configured to swing in a first direction when a forward force is exerted on the rear contact surface portion, and a rotation of the first main body in a reverse direction, which is opposite to the first direction, being restricted by a stopper, and
    the front contact surface portion is configured to make, at least at each of said at least one contact portion, an obtuse angle with an imaginary line extending from said first shaft member to the contact portion concerned;
    wherein said at least one contact portion of the front contact surface portion comprises a plurality of said contact portions, depending upon a radius of the beverage container, and the front contact surface portion has a bending shape.

2. The beverage container holding device according to claim 1, wherein said at least one first rotating member comprises at least two first rotating members, which are disposed at facing positions of the receiving portion, and
    said at least two first rotating members are spaced from each other in the receiving portion.

3. A console box extending rearwardly from a front center of a passenger compartment of a vehicle, the console box comprising a beverage container holding device according to claim 1, with the front of the receiving portion being toward a front side of the vehicle.

4. The console box according to claim 3, further comprising a tray continuously extending from a rear end of the beverage container holding device, with a surface of the tray being available for receipt of items.

5. A beverage container holding device comprising: a holder main body, which has a generally U-shaped receiving portion to receive a beverage container, with a top and a rear of the receiving portion being open, a front of the receiving portion is closed and opposite to the rear of the receiving portion; and at least one first rotating member, each of said at least one first rotating member being rotatably supported by the holder main body such that each of said at least one first rotating member swings horizontally so as to extend into the receiving portion and retract from the receiving portion,
    each of said at least one first rotating member comprising a first shaft member extending in an up-and-down direction, and a first main body rotatably supported by the first shaft member such that the first main body extends into the receiving portion and retracts from the receiving portion,
    the first main body comprising a rear contact surface portion, which the beverage container is configured to contact when the beverage container is moved toward the receiving portion from the rear of the receiving portion, and a front contact surface portion having at least one contact portion, which is configured to contact the beverage container received in the receiving portion forward of the front contact surface portion,
    the first main body being configured to swing in a first direction when a forward force is exerted on the rear contact surface portion, and a rotation of the first main body in a reverse direction, which is opposite to the first direction, being restricted by a stopper,
    the front contact surface portion is configured to make, at least at each of said at least one contact portion, an obtuse angle with an imaginary line extending from said first shaft member to the contact portion concerned,
    a second rotating member is disposed forward of said at least one first rotating member and supported by the holder main body such that the second rotating member can swing,
    wherein the second rotating member comprises a second shaft member extending horizontally, and a second main body, which is rotatably supported by the second shaft member and protrudes rearwardly from the front of the receiving portion, and
    the second main body has a second contact portion that is configured to contact the beverage container received in the receiving portion.

6. The beverage container holding device according to claim 5, wherein said at least one first rotating member comprises at least two first rotating members, which are disposed at facing positions of the receiving portion, and
    said at least two first rotating members are spaced from each other in the receiving portion.

7. The beverage container holding device according to claim 5, wherein said at least one contact portion of the front contact surface portion comprises a plurality of said contact portions, depending upon a radius of the beverage container, and the front contact surface portion has a bending shape.

8. A console box extending rearwardly from a front center of a passenger compartment of a vehicle, the console box comprising a beverage container holding device according to claim 5, with the front of the receiving portion being toward a front side of the vehicle.

9. The console box according to claim 8, further comprising a tray continuously extending from a rear end of the beverage container holding device, with a surface of the tray being available for receipt of items.

\* \* \* \* \*